Oct. 16, 1956  A. G. STIMSON ET AL  2,766,654
EXPOSURE METER WITH INCIDENT LIGHT ATTACHMENT
Original Filed Sept. 30, 1947  3 Sheets-Sheet 1
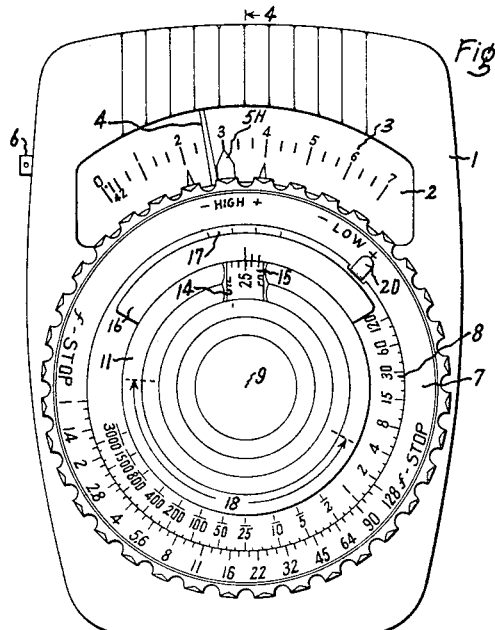
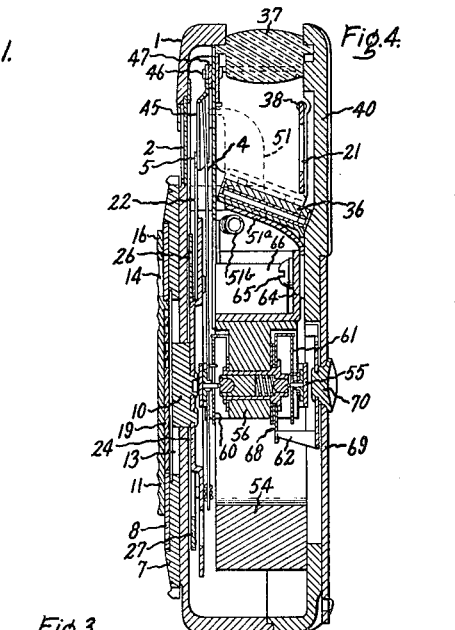
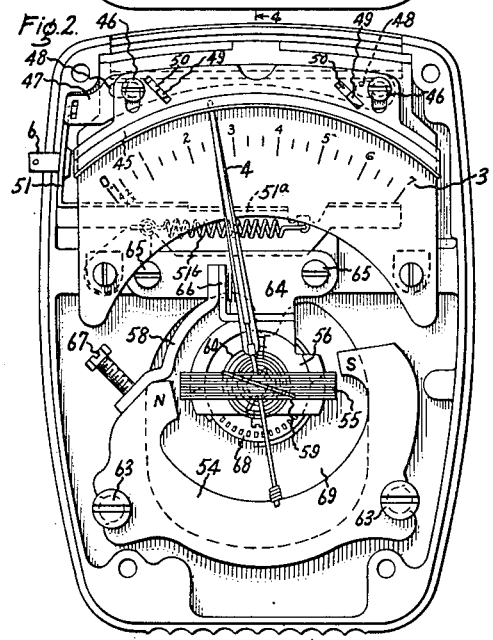
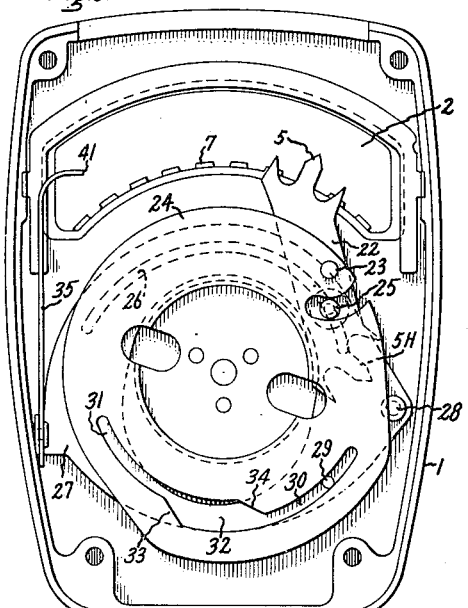
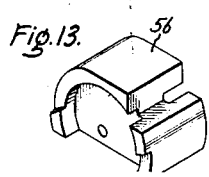
Inventors:
Allen G. Stimson,
Kermit Brynes,
Frederic B. Jennings,
Clement F. Taylor,
by Richard E. Hosley
Their Attorney.

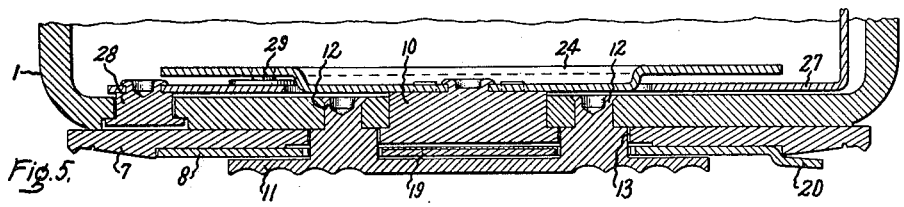
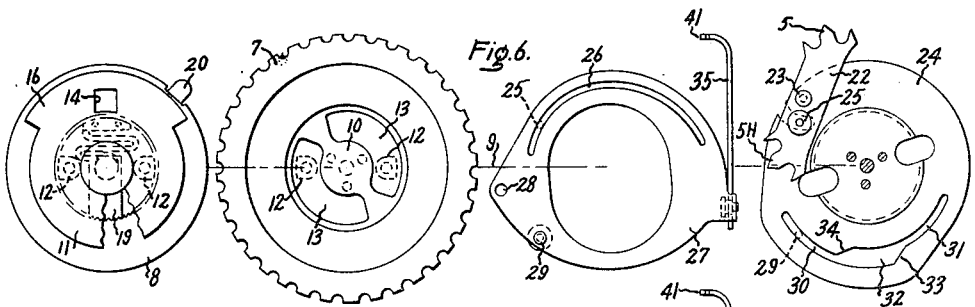
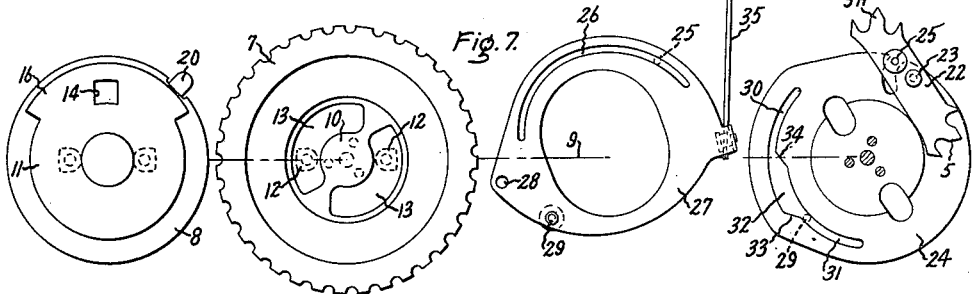
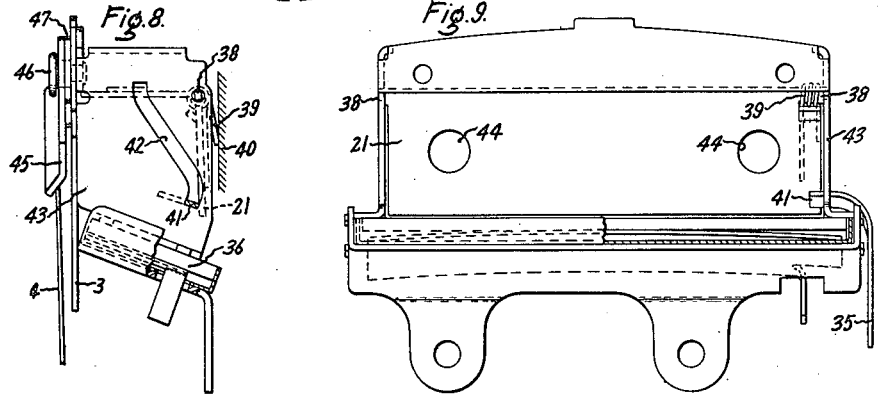
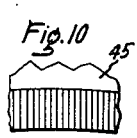
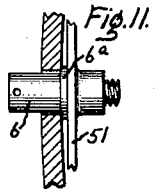
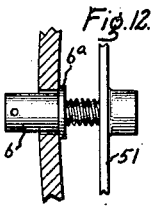
Inventors:
Allen G. Stimson,
Kermit Brynes,
Frederic B. Jennings,
Clement F. Taylor
by Richard E. Hosley
Their Attorney.

Inventors:
Allen G. Stimson,
Kermit Brynes,
Frederic B. Jennings,
Clement F. Taylor, by Richard E. Hosley
Their Attorney.

United States Patent Office 2,766,654
Patented Oct. 16, 1956

2,766,654

EXPOSURE METER WITH INCIDENT LIGHT ATTACHMENT

Allen G. Stimson, Lynnfield, Kermit Brynes, Salem, Frederic B. Jennings, Beverly, and Clement F. Taylor, Lynn, Mass., assignors to General Electric Company, a corporation of New York Original application September 30, 1947, Serial No. 777,086, now Patent No. 2,648,254, dated August 11, 1953. Divided and this application April 28, 1953, Serial No. 351,537

2 Claims. (Cl. 88—23)

This is a division of our copending application, Serial No. 777,086, filed September 30, 1947, now Patent No. 2,648,254, issued August 11, 1953 and assigned to the same assignee as the present application.

Our parent application relates primarily to a combined exposure meter and calculator.

This divisional application relates to a photographic exposure meter and correlated incident light attachment adapted for the convenient and accurate measurement of either incident or reflected light, selectively.

Another divisional application Serial No. 351,538, filed April 28, 1953, now Patent No. 2,739,506, issued March 27, 1956 relates to an exposure meter having an improved light sensitive cell and astigmatic lens arrangement.

In photography, it is sometimes desirable to measure the light reflected toward the camera from the scene to be photographed. At other times, it is more desirable to measure the light incident on the scene to be photographed. A principal object of the present invention is to provide an improved photographic exposure meter with which either of these measurements, selectively, may be made with equal ease and accuracy, employing a single meter scale for both measurements to avoid the inconvenience and possibility of error encountered in the use of multiple scale instruments. This and other objects and advantages are realized with the improved exposure meter and correlated incident light attachment herein described.

The features of our invention which are believed to be novel and patentable will be pointed out in the claims appended hereto. For a better understanding of our invention reference is made in the following description to the accompanying drawings in which Fig. 1 is an enlarged front view of our exposure meter;

Fig. 2 is a similar view with the calculator structure and front casing cover removed;

Fig. 3 is a rear view with the instrument, light cell and back cover removed to illustrate the index changing and shutter operating cam and link mechanism. This cam mechanism is rotatively supported on the back side of the front cover;

Fig. 4 is a central vertical cross-sectional view of the exposure meter;

Fig. 5 is a generally central horizontal cross-sectional view of the front cover, calculator, and cam structure;

Fig. 6 is a schematic exploded front view of different parts of the calculator and cam mechanism showing their relative rotary positions as adjusted for the low light value range of operation;

Fig. 7 is the same as Fig. 6, except showing the relative rotary positions of the same parts as adjusted for the high light value range of operations;

Figs. 8 and 9 show left side and front views of the light shutter mechanism in shutter open position and correspond to the rotary position of the cam and calculator parts as shown in Fig. 6;

Fig. 10 shows a detail of the pointer lock engaging plate;

Figs. 11 and 12 show details of the pointer lock to illustrate how it may be adjusted to a permanent pointer unlocked condition;

Fig. 13 is a perspective view of the instrument core structure;

Figure 14:
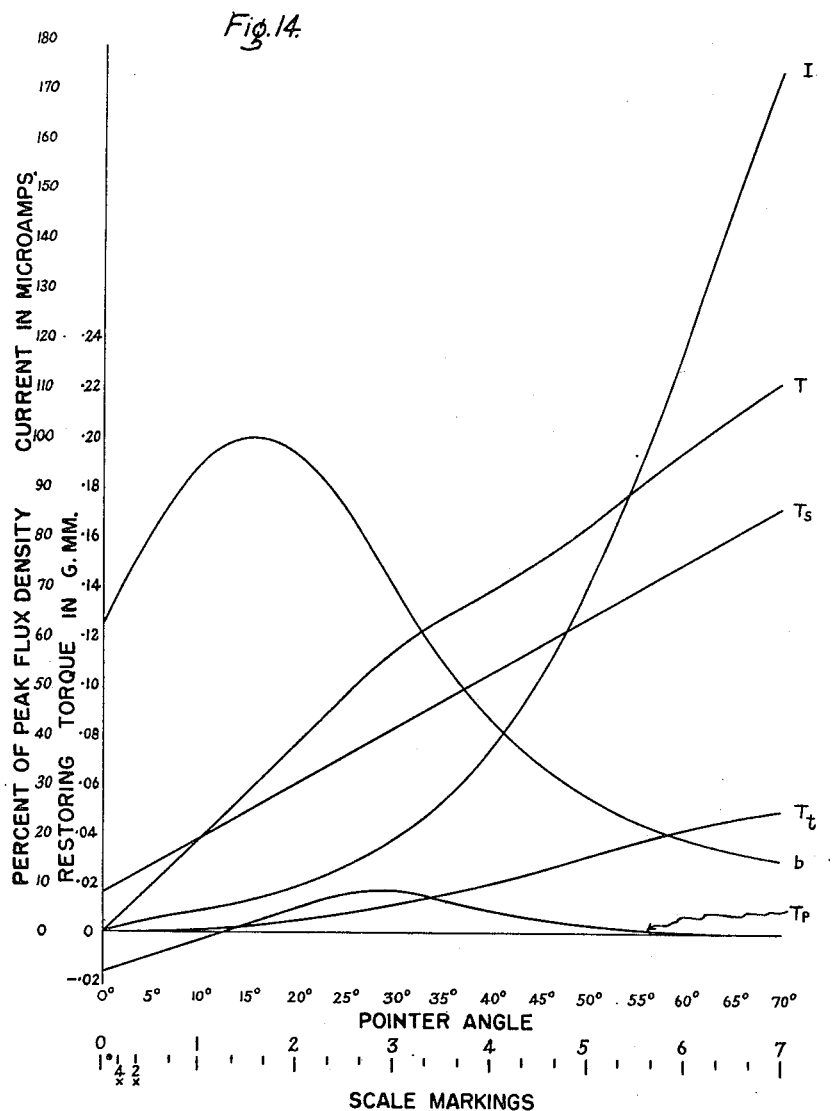
Fig. 14 shows various curves pertaining to the design of the electrical measuring instrument used.

Fig. 1 shows an appreciably enlarged front view of our exposure meter, 1 being the cover and section of the split casing in which and on which the several parts of the exposure meter are assembled. At 2 is a window covered with transparent material in which are exposed the scale 3, the instrument pointer 4 and the index 5H which is movable so as to be aligned with the pointer 4 in the operation and use of the device. Extending from the upper left side of the casing is a push button 6 which is a part of a pointer lock. The pointer 4 is normally locked from movement, but by pressing in on button 6 the pointer is released and assumes its proper light measurement position. Releasing the button 6 locks the pointer in such position until again released. This device is also adjustable for a permanent pointer unlocked condition.

The exposure calculator is mounted on the outer front cover of the meter and comprises the stop scale disk 7 and exposure time scale disk 8. These disks are rotatively mounted on the same axis 9 of rotation as the pointer 4 of the electrical measuring instrument. The smaller exposure time disk 8 fits in a circular recess in the upper surface of the stop disk 7 and is rotatable in such recess. This is best shown in Fig. 5. The stop disk 7 has an inwardly extending central hub 10 having a bearing fit through a center opening in the front wall of the cover structure 1. The exposure time disk 8 is held in place in its recess in disk 7 by a stationary masking plate 11 riveted to the front cover of the casing by two rivets 12 integral with plate 11 horizontally on opposite sides of the axis of rotation 9 and extending from the rear of the plate 11 through two arc-shaped slots 13 in the stop disk 7 (see Figs. 5 and 6). The masking plate 11 has a window opening 14 therein above the axis of rotation in which a portion of a film speed scale 15 on the exposure time disk 8 may be seen. Masking plate 1 also has an arc-shaped extension 16 which serves to cover that exposure time scale on disk 7 which is not being used.

There are two film speed scales and two exposure time scales on disk 8. One film speed scale and one exposure time scale is visible at one time. The scales shown in Fig. 1 about the lower periphery of disk 8 and in the window 14 are those usually employed for use with still cameras. The other exposure time scale and film speed scales are mostly hidden, although the exposure time scale in frames per second for use in taking motion pictures is partially exposed at 17, at the upper edge of mask 16 in Fig. 1. The motion picture film speed scale to be used with scale 17 is beneath mask plate 11 between dotted lines 18. The disk 8 may be rotatively adjusted for either of these uses. To change for use in taking motion pictures, the disk 8 is simply rotated about 180 degrees from the position shown. This will expose the motion picture film speed and frames per second exposure time scales where those for still camera use are now represented in Fig. 1. For convenience in adjusting stop disk 7, its outer periphery it toothed as shown, and these teeth are spaced at one f-stop intervals to correspond with the logarithmic response distribution of the instrument scale 3. By one f-stop here we mean the angular distance the pointer moves when the light value doubles and we are not referring to the particular f-stop scale used on the calculator.

The disk 8 is normally locked against rotation with respect to disk 7 by a toothed pawl 19 beneath the center portion of mask plate 11 (see Figs. 4, 5 and 6). A central section of this pawl is in the form of a compression spring. The teeth in one end of this pawl engage with a toothed surface cut in the inner periphery of disk 8, as seen at the left in Fig. 6 and the other end is fixed to the inner side of mask plate 11. The spring portion of pawl 19 normally holds its toothed end against the toothed inner surface of disk 8 with the teeth in mesh so as to prevent accidental and unintentional rotation of disk 8, but by applying turning pressure to disk 8 by tab 20, the disk 8 may be rotatively adjusted by reason of the slipping by of such teeth, the resiliency of the spring permitting this but forcing full intermeshed and disk positioning engagement as soon as the turning pressure is removed.

The pitch of these teeth is the same as the smallest graduations on the film speed scale 15 seen in window 14, and the arrangement is such as exactly to position such graduations in line with any of the reference marks adjacent such window. It will be noted from Fig. 1 that there are three such stationary reference or fiducial marks on the mask plate portion 16 opposite window 14. The larger left-hand mark is for setting film speeds for still pictures or for movie cameras which give $\frac{1}{30}$-second exposure at sixteen frames per second. The middle small mark is for movie cameras which have $\frac{1}{40}$-second exposure at sixteen frames per second, and the right-hand small mark is for movie cameras which have $\frac{1}{50}$-second exposure at sixteen frames per second. These marks are positioned for correctly setting the calculator for the film speed used for the conditions above specified, and proper instructions as to such settings will accompany the device.

In a logarithmic exposure meter having only one light measurement range, the index 5H which is to be aligned with pointer 4 by rotation of disk 7 could be a properly positioned projection integral with disk 7. As a matter of fact, in a meter having a double light measurement range as herein described, two properly positioned indexes such as 5H could be made integral with disk 7. However, both would then be exposed to view simultaneously, and the use of the device would become confusing. We have, therefore, devised a mechanism for alternately exposing two indexes designated 5 and 5H, the index 5 being exposed as shown in Fig. 6 when the light value range is low and the shutter shown at 21 in Figs. 4, 8 and 9 is open as represented, and the index 5H being exposed, as shown in Figs. 1 and 7 when the light value range is high and the shutter is closed. These indexes appear at the proper positions at the upper periphery of disk 7 and indicate on scale 3 and, when fully exposed, move in unison with the disk as if integral therewith. Also, the shutter 21 is operated and the indexes changed with such operation automatically at the proper times simply by rotation of disk 7 in the normal procedure of measuring the light value and setting the exposed index 5 or 5H in alignment with pointer 4.

The two indexes 5 and 5H are the opposite ends of a link member 22 pivoted at 23 to a cam plate 24 which is riveted to the hub 10 of, and rotates with, disk 7 (see Figs. 3, 5, 6 and 7). The cam plate 24 is inside the front cover of the casing part 1, and link member 22 is pivoted on the front upper portion of the cam plate 24. Secured in link 22 at one side of its pivot point 23 is an operating pin 25. This pin extends towards the front into a groove 26 contained in a lever plate 27 pivoted at 28 to the inside front wall of casing structure 1. The center portion of lever plate 27 is cut out so that the plate is free to oscillate to a limited extent about its pivot point 28 without being hindered by the central connecting structure between hub 10 and cam plate 24. Lever plate 27 contains a pin 29 extending to the rear into a cam slot in cam plate 24. This cam slot has a narrow sector 30 of large radius, a narrow sector 31 of small radius, and an intermediate wide sector 32, the outer and inner edges of which conform to the outer and inner edges of the sectors 30 and 31. The purpose of the cam slot of cam plate 24 and pin 29 of lever plate 27 which is contained in such slot is to oscillate the lever plate 27 to a limited extent about its pivot 28 as the cam plate 24 is rotated by disk 7 over the range of its rotary movement in opposite directions.

Thus, starting with the parts in the positions represented in Fig. 6 when cam plate 24 is rotated clockwise, pin 29 will first ride in narrow slot sector 30, then in wide slot sector 32 following its outer edge, and finally in narrow slot sector 31, which is the condition represented in Fig. 7. During such operation lever 27 remains stationary until pin 29 strikes against the inclined surface at point 33 and will then be raised by rotation counterclockwise about its pivot at 28. In the meantime the pin 25 of link 22 has ridden around to the right in slot 26 at a uniform radius with respect to the axis of rotation 9 until the lever plate 27 is raised, at which time the pin 25 is moved outwardly from the axis of rotation 9 and in so doing turns the link 22 clockwise about its pivot 33 from the rotary position which it has on cam plate 24 shown in Fig. 6 to that shown in Fig. 7. This movement of link 22 pulls index 5 down from its visible position in window 3 and substitutes the opposite end index 5H in such window, and at a position along the scale 3 which is to the left of that which index 5 had when it disappeared. For the remainder of the range of clockwise rotation of cam plate 24, pin 29 rides in narrow slot 31 of uniform radius and there is no further raising of lever 27, and index 5H is simply rotated along scale 3 without radial movement.

Now assume that we rotate cam plate 24 counterclockwise over the range of its movement. Pin 29 rides in narrow cam slot 31 and along the inner periphery of wide slot section 32 until it strikes against the inclined surface at 34. At this point lever plate 27 is lowered from the position shown in Fig. 7 or rotated clockwise about its pivot 28 to the position shown in Fig. 6 and remains in such position during the remainder of the rotation of the cam plate in the counterclockwise direction with pin 29 riding in the uniform radius slot sector 30. During such counterclockwise rotation of cam plate 24 the link member 22 thereon is carried around to the left with index 5H visible in window 2 until lever plate 27 is lowered at the point where pin 29 strikes inclined surface 34. At this point link 22 is rotated on cam plate 24 from the condition represented in Fig. 7 to that shown in Fig. 6 such that index 5H is pulled out of sight and index 5 raised to view in window 2, but at a position along scale 3 which is to the right of that where index 5H disappeared. It will thus be seen that the index 5 may be used over the range of operation corresponding to the combined length of slot sector sections 30 and 32, and that index 5H may be used over the range of operation corresponding to the combined length of slot sectors 32 and 31. This overlapping range of operation is desirable for convenience and avoids any unusable change-over spot when changing from one index to the other.

Lever plate 27 is provided with a hook-shaped upward link extension 35 which allows the shutter 21 to move from open to closed position when the link 35 is raised simultaneously with the shift in visibility from index 5 to 5H, and which opens the shutter when lowered simultaneously with the shaft in visibility of index 5H to index 5.

As best shown in Fig. 4, the light cell 36 is contained in the upper portion of the casing beneath a lens window 37 in the upper end of the casing. The light cell is hermetically sealed and is thus protected against deterioration by moisture and dirt. The instrument has a wide horizontal field of view and a narrow field of view vertically. It will be evident that the meter is intended to be held in the hand with the calculator uppermost and with the lens window 37 held towards the light source to be measured in a horizontal direction. The desired field of view is obtained by mounting the elongated rectangular cell 36 some distance back of the elongated rectangular light admitting window. The window comprises an astigmatic positive lens 37 and is used to increase the amount of light admitted from a fixed field of view and to sharpen the cutoff at the edges of the field. Thus the lens window shape is such as to give a restricted vertical field of view so as to avoid errors due to excessive high lights, such as the sun, and to give a desirable, wide horizontal field of view. The lens curvatures are such that parallel light in a vertical plane is focused approximately on the photocell, whereas light in a horizontal plane is focused some distance back of the cell. The rear of the scale plate which forms the front or upper wall of the cell box is unblackened to admit more light from down angles. The cell is tilted forward to admit less sky light. The field of view is smaller when the shutter 21 is closed than when it is open. The proper change in field of view is obtained by cutting holes in the shutter near its ends. The shutter 21 is pivoted at each end at points 38 and is biased to a closed position by a spring 39 coiled about the pivot stud of the shutter (see Figs. 8 and 9), with its ends restrained between the back wall part 40 of the casing and the back side of the shutter. The shutter is represented in the open position. The hook rod 35 extends upwardly from lever plate 27 to a position outside of one end of the shutter and is formed inwardly to have its upper end 41 extend to the front side of the shutter. The hook end 41 of the link 35 extends through a guide slot 42 in an end wall of a supporting box structure 43 for the shutter parts. The guide slot 42 is narrower than the width of the strip material of which the link 35 is made, and the strip is notched where it passes through the guide slot, so that it will not become displaced. It will now be evident that when the hook rod 35 is raised, it is guided upward and towards the front by slot 42 and allows the shutter 21 to swing upward and towards the front, or clockwise as viewed in Figs. 4 and 8, to window closing position. The closed position of the shutter is represented in dot-dash lines in Fig. 8. This will cut off a desired portion of the light entering the window 37 from cell 36. However, the shutter contains holes 44 as seen in Fig. 9 which allow a predetermined reduced proportion of the light to strike the cell when the shutter is closed. These holes are properly placed and dimensioned to obtain the desired light reduction and desired reduced horizontal field of view for high light values when the shutter is closed. It is evident that when the hook rod 35 is pulled down by lever plate 27, it will also pull the shutter open. The shape of the lower end of guide slot 42 is such as to provide a shutter open locking action against the tendency of the spring urged shutter to close. Thus in Fig. 8 it is seen that the notched end 41 may not be moved upwardly in slot 42 by sidewise pressure from shutter 21. The weight of lever plate 27 is not sufficient to open the shutter against the action of shutter closing spring 38 but the shutter must be positively pulled open by the operation of lever 27.

In a logarithmic exposure meter it is necessary that the logarithmic response of the instrument be the same as the logarithmic system used in laying out the calculator scales in order to permit direct angular correlation between the instrument pointer and the calculator scales. We have chosen a logarithmic instrument response where the logarithmic base is 2 and where the light value doubles for every 10 degrees of clockwise deflection, and a calculator where the F stop exposure time and film speed graduations correspond thereto. Thus it will be noted that the spacing of the major graduations on the instrument scale 3, the stop scale on disk 7, and the film speed scale appearing in window 15 are all 10 degrees apart. This is also substantially true of the shutter time scale on disk 8, the variation being due to the use of conventional time values. However, the log constant used for all scales is the same. We do not limit our invention to this 10-degree relation because following the principles described herein we may build instruments embodying our invention where this relation may be appreciably different such as between five and 20 degrees.

From the above it will be evident that the logarithmic instrument response corresponds exactly to calculator scales used and, consequently, for a given shutter opening, a fixed point on the stop scale plate 7, which may be one of the trident pointers 5 may be aligned with the pointer 4 for correlating the calculator with the light value measurement, and it is unnecessary to read the instrument scale 3. In fact, the logarithmic scale graduations 3 may be omitted without inconvenience when the device is used as an exposure meter but are useful when the device is used as a light meter for measuring reflected or incident light.

The distance apart along the stop scale disk 7 where the pointers 5 and 5H appear must correspond to the shutter factor employed. The shutter factor may be considered the ratio of useful light value with the shutter open to such value with the shutter closed. In the device described the shutter factor, determined primarily by the size of the openings 44 in the shutter, is 16 and this corresponds to 4 of the main graduations on the logarithmic scale 3. Thus, if with a given light value and with the shutter open, the instrument reads on the graduation 6, it will read on graduation 2 when the shutter is closed. It is to be noted that the shutter factor of 16 is chosen in relation to the base 2 of the logarithmic system used, so that the two indices 5 and 5H can both line up exactly with the 10-degree spaced graduations or projections on the periphery of the stop scale plate. These graduations correspond to the angular distance the pointer moves for each doubling of the light value. This correlation is valuable in the use of the meter for light scanning purposes in both the high and low light measurement ranges. Hence, the device is designed so that pointed 5H used with high light values and the shutter closed will appear a corresponding distance to the left of pointer 5 used with low light values with the shutter open. This distance corresponds to four main instrument logarithmic graduations and four of the peripheral notches or "f-stop" graduations on the disk 7, or 40 degrees arc. The two pointers 5 and 5H have a large overlapping range of operation and either may be used over practically the entire range of logarithmic operation of the scale 3 with their corresponding shutter positions. In the meter described the shutter factor of 16 is obtained by the two round holes 44 in the shutter, each hole having a diameter ⅓ the width of the shutter.

The positions of pointers 5 and 5H for shutter open for low light values and closed for high light values are marked near the periphery of dial 7 with the inscriptions "Low" and "High." See Fig. 1. Hence these designations together with pointers 5 and 5H also indicate the position of the shutter. Fig. 1 shows the index 5H at "High," indicating a setting for a high light value with the shutter closed. It will be noted that each of the pointers 5 and 5H have two smaller tines or pointers spaced on either side thereof one f-stop graduation away and hence may be called tridents. The small pointers on the left are marked —, and those on the right are marked +. These auxiliary pointers add considerably to the usefulness of the device. It is at once apparent that these auxiliary pointers facilitate the use of exposure information increased or decreased by one f-stop. These triple point pointers or tridents further facilitate scanning, light balancing, estimating scene brightness range, and selection of the best exposure for unusual scenes in a manner explained in instruction books supplied with each device.

The instrument pointer 4 is normally locked from movement by reason of the fact that its outer end is engaged by a pointer lock plate 45 (Figs. 2, 4 and 8). This plate has a beveled and curved lower edge, the curve conforming to the arc of swing of the pointer and the bevel extending downward as viewed in Fig. 2 and to the front of the outer end of the pointer and normally in contact therewith. The plate 45 is slidable in a vertical direction as viewed in Fig. 2 to a limited extent on pins 46 which extend through vertical slots in plate 45. The plate may be raised from pointer locking position to release the pointer by a cam mechanism consisting of a cam plate 47 which is located directly behind the upper part of locking plate 45 and which is slidable to a limited extent in a horizontal direction. Cam plate 47 has horizontal slots 48 therein, and the pins 46 also extend through these slots. Thus locking plate 45 is slidable vertically and cam plate 47 is slidable horizontally on pins 46. Locking plate 45 has cam slots 49 therein extending diagonally downward and to the right as viewed from the front as in Fig. 2, engaged by cam pins 50 extending forward from cam plate 47. As shown in Fig. 2, the cam plate 47 is engaged at its left end, through a pin and slot connection, by an operating member 51 into which the push button 6 is threaded (see Figs. 11 and 12). The member 51 extends downward and has a right angle bend and horizontal extension 51a to the right beneath the scale plate 3. This extension is arranged to be held flat against and to slide on the underside of the light cell box. The lower edge of 51a is retained in place by the overlying upper edge of a holding part 64. A tension spring 51b whose left end is fixed beneath the left end of scale plate 3 adjacent the holding screw therefor has its other end hooked to the extension 51a and urges such extension and with it part 51, push button 6 and cam plate 47 to the left in pointer locking position. Now, when the push button 6 is pushed inward, parts 51 and 51a move to the right, further tensioning spring 51b, and locking plate 45 is moved upward and the pointer 4 is unlocked. Releasing the push button causes the spring 51b to return the parts to pointer locking position. Thus any light measurement reading may be retained as long as desired.

As shown in detail in Figs. 11 and 12, the push button 6 has an enlarged collar 6a inside the wall of casing cover 1 which is slightly larger than the opening for the push button through such wall. This requires that the push button be inserted into place from the inside. The collar 6a serves two purposes. It serves to seal the opening against dust as the collar is normally held tight against the opening by spring 51b, Fig. 2. It also serves in conjunction with the screw threaded connection with member 51 as a means for retaining the locking mechanism in the pointer unlocked position without holding the push button 6 in by the thumb.

The outer end of the push button 6 may have a screwdriver slot or a hole extending therethrough to facilitate turning the same to change the arrangement from the permanent pointer unlocked condition shown in Fig. 12 to the normal condition shown in Fig. 11, where the pointer is normally locked but may be temporarily unlocked by pushing in on the button. In the illustration the outer end of the push button has a hole therethrough through which a paper clip, wire or the like may be inserted to use as a wrench in screwing out and screwing in the button 6. Fig. 11 represents the normal condition of the parts with the pointer locked. By partially or completely unscrewing the push button from member 51 as represented in Fig. 12, member 51 is necessarily moved to the pointer unlocking position because the push button cannot move to the left due to the engagement of collar 6a with the casing. Thus in the condition represented in Fig. 12, the pointer 4 of the instrument is permanently unlocked, which is desirable for some uses of the meter in the darkroom.

Another feature of the pointer lock mechanism which should be mentioned is represented in Fig. 10. This represents a small section of the underside of the pointer engaging surface of locking plate 45. It is noted that this surface is corrugated with closely spaced depressions parallel to the pointer when the latter is in a central deflecting position. The upper surface of the pointer which is engaged by this corrugated surface when the latter is moved to pointer locking position has a triangular or humped shape to engage into the nearest depression in the locking surface. Thus as the plate 45 is lowered to full locking position, the pointer slides in the depression and does not move sidewise. Hence the pointer is locked in the correct indicating position without erroneous sidewise movement when being locked. In a locking action the pointer is not forced down against the scale plate but merely engaged lightly by the corrugated surface of the locking plate.

The design of an electrical measuring instrument for the conditions encountered to obtain the logarithmic scale described in our long range exposure meter is very exacting. The measurement light range is from about 0.4 to 4000 candles per square foot. The light cell current and instrument current variation is from zero to about 180 microamperes. To obtain a logarithmic scale in which the instrument current doubles for every ten degrees of deflection in a small instrument of this current range requires a permanent magnet field which varies in the relation, for example, from the maximum of about 3500 gauss at fifteen degrees deflection to about 500 gauss at full scale or 70 degrees deflection.

The flux gradient is so high that the armature, carefully designed to be nonmagnetic, is nevertheless attracted toward the strongest point of the field due to minute magnetic impurities in the nonmagnetic materials used in its construction, such as aluminum, copper, and insulation. This attraction is herein designated parasitic armature torque. It reverses in direction over the deflection range and is sufficient to cause serious error unless compensated for. Another difficulty encountered is that the current output of a photocell decreases with rise in temperature, and the percentage decrease is greatest at high current outputs. This temperature error must be compensated for. Another condition to be provided for is that different photocells, although of the same size and design, have somewhat different current outputs for a given light value, and adjustments must be provided to match different instruments with different light cells. All of these difficulties have been taken care of in our device so as to obtain high accuracy, and the desired logarithmic response except over the little used scale range from 0 to 7 degrees pointer deflection, and over this range we have provided corrective multiplier factors that nevertheless enable accurate use of the device.

The measuring instrument is illustrated in Figs. 2, 4 and 13, and its principal parts comprise a U-shaped permanent magnet 54, an armature coil 55, an inner magnetic core 56 (shown in perspective in Fig. 13), pointer 4, adjustable flux diverter 58, temperature compensator 59, lead-in return springs 60 and 61, and zero adjuster 62. The permanent magnet 54 has salient poles, the one on the left designated N, having an armature pole face in the neighborhood of 30 degrees arc and is somewhat larger in a peripheral direction as compared to the right-hand pole face designated S. The S pole has an arc length approximately equal to the width of the armature coil 55. This magnet is secured to the base 40 or back portion of the casing by screws 63 engaging cast-in lugs of the magnet. An exceptionally high grade of permanent magnet material is used, and the magnet is permanently magnetized to a stabilized high intensity. The inner magnetic core 56 is of modified salient pole construction. The left-hand salient pole of the core extends from about the 15-degree deflection position of the armature opposite the N pole of the permanent magnet in a clockwise or upscale direction over the entire deflection range of the coil and beyond. The right-hand salient pole of the core extends from about the 15-degree armature deflection position opposite the S-pole of the permanent magnet clockwise or upscale about 50 degrees arc and about 30 degrees beyond such south pole. The axial length of the core pole pieces is longer than the inner portion of the core, and opposite the 15-degree position of the armature both salient core pole pieces have still longer axial extensions at the upper side to increase the air gap flux concentration at this point. The core is supported to the base portion 40 of the casing independently of the magnet 54 by a member 64 secured to the upper side of the core and fastened to the base by screws 65. The member 64 is of non-magnetic material and has an upturned part 66 integrally united with the upper end of the flux diverter 58.

The lower end of the flux diverter 58 is resiliently pressed toward the N pole of the permanent magnet 54 by the connection 66 and would contact such N pole, except for a brass screw 67 threaded through the lower end of the flux diverter and engaging the magnet. By turning screw 67, the air gap between the flux diverter and the N pole of the permanent magnet may be varied. In this way the flux distribution is changed, particularly with respect to the upper half of the deflection scale range. This, together with a knockdown adjustment of the permanent magnet strength, comprises the adjustment for accommodating the instrument to the particular light cell installed therewith. For example, if a light cell having a low output at high level is installed, the flux diverter is allowed to approach more closely to the N pole, diverting more flux to the part 58, thus increasing the instrument flux over the upper portion of the deflection range to compensate for the decreased current over such range.

The armature coil 55 is wound on an aluminum shell which provides damping. An armature coil of 1000 turns of insulated wire has been found satisfactory for light cells of 0.7 square inch area. The armature diameter is greater than its axial length, for the purpose of accommodating it in a thin instrument while still obtaining high torque. It has internal pivot bearings the jewels of which are supported in an axial bore of the core 56. It has been found that the armature should be in the most intense flux field when at about 15-degrees deflection, and this is obtained by zero adjustment and bending of the pointer 4 slightly one way or the other to arrive at the correct condition. The zero adjustment is made by adjusting the lower control and lead-in spiral 61. Its outer end is secured to an adjusting disk 68 frictionally rotatively mounted on the core 56 concentric with the armature axis of rotation. This disk 68 has a circular row of holes therein as seen in Fig. 2. A removable back plate 69 in the back wall of the casing contains a short port 70, with a screwdriver slot in its outer end and pivoted in the back plate on the armature axis of rotation, and to which is fastened the zero adjuster arm designated 62. This arm rotates on a circle of the same radius as the row of holes in disk 68 and is pointed on its forward end so that when the back plate with the zero adjuster parts 70 and 62 assembled therein is put on, the forward end of arm 62 can enter one of the holes in disk 68. Then by turning part 70 with a screwdriver or the equivalent, the zero of the instrument can be adjusted. The armature coil is of course connected to the light cell 36 through the lead-in spirals 60 and 61 and other suitable connections.

To obtain the high magnet strength necessary in our permanent magnet 54, it is necessary to magnetize the same with the core 56 or an equivalent keeper in place and to avoid any further increase in the reluctance of the magnetic circuit thereafter. Hence the magnet and core are assembled in place in the back of the instrument casing 40 prior to such magnetization. With the back plate 69 removed, current conductors are passed through the space between the core 56 and yoke of magnet 54 and then energized permanently to energize the magnet 54.

Fig. 14 represents curves which are typical of the electrical measuring instrument of our invention. For these curves the abscissa represents degrees deflection and scale marking. Curve $b$ represents the useful flux density distribution plotted in per cent of its maximum. It is seen that at zero deflection the flux distribution is about 62 percent of maximum and rises rapidly to a maximum of 100 percent at about 15 degrees deflection, and then decreases at a progressively slower rate to 15 per cent at 70 degrees deflection. The typical photocell armature current curve at a given temperature is represented by I, for which curve the ordinate is in microamperes. The 20-degree deflection point on this curve is 9.3 microamperes and is the current that would be produced with the shutter open and a light brightness of eight candles per square foot. It is also the current that would be produced with the shutter closed and a light brightness of 128 candles per square foot. The relation between these values corresponds to the shutter factor of 16.

The product of useful flux density $\beta$ and armature current I produces the upscale deflection torque. This torque is opposed by the spiral spring torque $T_s$. Other torques which must be considered in our instrument are the temperature compensating torque $T_t$ and the parasitic armature torque $T_p$. The armature deflection position is that position where the algebraic sum of all of these torques is zero. The parasitic armature torque is negligible in the usual moving coil permanent magnet field instrument because the flux density for different armature positions is substantially uniform. However, in our instrument where the flux density changes in the radical manner represented by curve $b$, parasitic armature torque is appreciable. It is caused by magnetic impurities in the armature structure and can be visualized by assuming that the armature is slightly magnetic, as it is. The armature thus tends to line itself up with the strongest field, which in our device is at about the 15-degree deflection position, and to produce zero torque at this position. However, if moved downscale from this position, it would produce an upscale torque and if moved upscale from this position, would in general produce a downscale torque.

The character of this parasitic torque at different deflections is represented by the curve $T_p$. The torque curves are plotted in gram millimeter values against deflection. From zero to 12.5 degrees this is an upscale torque; at the vicinity of the flux peak it is zero; from this point there is a downscale torque which decreases to zero at the upper end of the scale. This torque $T_p$ can be measured alone when the spring spirals and temperature compensator are removed.

The downscale spring torque is represented by the straight line $T_s$. This line does not go through zero at zero deflection because in order that the instrument pointer will be zero at the proper place, the upscale parasitic torque $T_p$ must be cancelled by a downscale spring torque. Hence, the downscale spiral spring torque $T_s$ is adjusted to equal the upscale parasitic torque $T_p$ at zero deflection.

$T_t$ represents the torque provided by the temperature compensator 59 at 25 degrees centigrade. The temperature compensator 59 may be made of Carpenter steel which is an alloy of nickel and iron, the nickel content being about 29.75 per cent and heat-treated to have a desired negative temperature coefficient of permeability. It will be noted from Fig. 2 that this compensator is orientated on the armature so as to align itself with the concentrated field axis at zero degrees deflection, and hence, it produces zero torque at zero deflection regardless of temperature. As the armature turns upscale, the compensator turns more and more crosswise of the field and hence produces a progressively increasing downscale torque. Curve $T_t$ represents such torque at constant temperature. This entire curve would be proportionally raised or lowered as the temperature is decreased or increased, and is approximately shaped to compensate for the temperature error of the usual photocell, which suffers a reduction in current output with temperature rise, which is more pronounced at high light values than at low light values. Using Carpenter steel and with three-fourths inch between the pole faces of the permanent magnet, we have found that a temperature compensator ⅜ inch long and 0.0001 square inch in cross-sectional area is satisfactory. This compensator may be placed inside or outside the armature coil.

The curve T represents the sum of the curves $T_p$, $T_s$ and $T_t$ and is the downscale torque to be matched by the upscale instrument torque produced by the product of useful flux and armature current, or more specifically, $\beta SNI$ defined later. The resulting deflection response of the instrument is logarithmic with respect to light from seven to 70 degrees, and in the particular design described the deflection increases 10 degrees for each doubling of the light value. Errors due to parasitic torque and temperature are eliminated, and an instrument light cell measurement combination of high sensitivity and accuracy results.

Owing to variations in different magnets, light cells and magnetic impurities in the armature and their distribution in the armature, the curves of Fig. 14 will vary somewhat in different instruments.

In order to protect pocket watches and the like from the high permanent magnetism of the permanent magnet 54 used in our instrument, as well as to shield the instrument from external magnetic influences, the calculator in front of the instrument, parts of the light cell structure above the instrument and the back plate 69 of the device are made of magnetic materials. The effect of these shields in reducing the flux of the magnet and changing the flux distribution must be taken into account in the design of the instrument.

While there is little occasion to use the device for photographic data with an instrument deflection below seven degrees where the scale is no longer logarithmic, nevertheless, multiplying factors are provided for this purpose and will sometimes be useful.

Fig. 2 shows three instrument graduations next to zero for this purpose. When the instrument pointer falls on the upper one of these graduations marked 2X, low light value index 5 is moved downscale as far as it will go, which is to the seven-degree point corresponding to the next division mark above the one marked 2X. The exposure given by this lowest setting of the index 5 should then be multiplied by the factor 2. For example, instead of using a 30-second exposure, use a 60-second exposure. If the instrument deflection is at the indication marked 4X, the exposure should be multiplied by a factor of 4 and if the instrument pointer is on the lowest indication above zero, which is a dot, a multiplying factor of 8 should be used.

Figure 15:
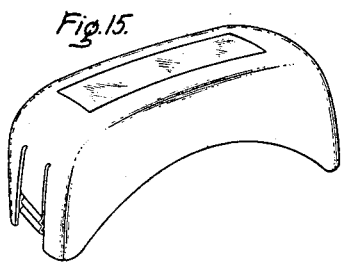
Fig. 15 illustrates an incident light attachment used with our exposure meter.

Fig. 15 shows an incident light attachment designed for use with our exposure meter. In measuring and balancing the light for photography, particularly for motion pictures, sometimes the exposure meter is pointed toward the camera or light source from the subject position. This illumination is termed incident light. When so used, the incident light attachment is slipped on over the light measuring window end of our device and is fitted for that purpose. It is provided with a window of opal glass or the like which receives and diffuses the transmitted light. The photographic exposure data obtained by the meter for taking a given photograph using incident and reflected light methods of measurement should be the same under the average condition both when the shutter is open and when it is closed. The diffusion enables the meter to respond to oblique light in proportion to the cosine of the angle of incidence from the normal. The opal glass is of such density and area that the calculator constants give the correct exposure, based on the formula $$T = \frac{6A^2}{IS}$$

where $T$ = Exposure time in seconds
$C$ = 20, A. S. A. calibration constant, incident light
$A$ = Relative aperture or $f$-number of lens
$I$ = Incident light on foot candles
$S$ = Film exposure index.

An opal glass window of approximately ⅛ inch thickness in the incident light attachment gives this result. Different samples of opal glass because of difference in density will have different light transmitting characteristics, and the ⅛ inch dimension here given is only approximate and will vary with the transparency and diffusing characteristics of the glass or other window used. The area and shape of the diffusing window is preferably the same as the transparent window. This is in combination with the proper positioning of the holes 44 in the shutter as shown in Fig. 9 enables the meter to give the same results for both reflected and incident light measurements with the shutter open or closed.

EQUATIONS USED IN THE DESIGN AND DEVELOPMENT OF OUR EXPOSURE METER

In order to describe the design of our exposure meter as accurately as possible, the mathematical equations which govern this instrument will be briefly discussed.

The exposure equation is:

$$\frac{A^2}{TS} = \frac{B}{K} = \frac{E}{C} \quad (1)$$

where, $A$ = Relative aperture or $f$-number of lens
$T$ = Exposure time in seconds
$S$ = Film speed index
$B$ = Scene brightness, reflected light in c./ft.$^2$, c./ft.$^2$ being candles per square foot
$K$ = 1.35 = A. S. A. calibration constant for reflected light
$E$ = Incident light in ft.-c., ft.-c. being foot candles
$C$ = 20 = A. S. A. calibration constant for incident light.

The values of the constants K and C were determined by photographic tests. With our optical system, the given values result in optimum pictures. This equation, in combination with the angle per $f$-stop value, $\theta_2 = 10°$, is used in laying out the calculator. This equation also defines what the transmission characteristics of the incident light attachment must be, because it says that the effective brightness inside the attachment must be $K/C = .0675$ times the illumination on the outside.

The calibration of the various scales of our meter from 7° to 70° pointer deflection where the instrument distribution is logarithmic is given by the following equations:

$$B_L = \frac{B_H}{R} = \frac{K}{C} \quad E_L = \frac{K E_H}{CR} = B_0 \cdot 2^{\theta/\theta_2} \quad (2)$$

where, $B_L$ = Low scale brightness in c./ft.$^2$
$B_H$ = High scale brightness in c./ft.$^2$
$R$ = 16 = scale ratio or shutter factor
$E_L$ = Low scale illumination with incident light attachment in ft.-c.
$E_H$ = High scale illumination with incident light attachment in ft.-c.
$B_0$ = 2 c./ft.$^2$ = a constant which determines values of major scale divisions
$\theta$ = Pointer deflection in degrees
$\theta_2$ = 10° = angle per f-stop = increase in deflection when light is doubled
$\theta/\theta_2$ = Scale marking of the meter.

This set of equations was used to work out the table which gives the calibration of the meter scale. In order to get the calibration from 0° to 7°, it was assumed that the distribution was linear in this region. This assumption has been shown by experiment to be sufficiently accurate.

In designing the instrument mechanism, the following equations are used:

$$I(B_L) = I(\theta) \quad (3)$$

according to Equation 2

$$I = T/\beta SN \quad (4)$$

$$T = T_s + T_p + T_t \quad (5)$$

where, $I(B_L)$ = Current output of photocell as a function of brightness, at constant temperature and load resistance
$I(\theta)$ = Desired current vs. deflection characteristic for a particular photocell obtained from $I(B_L)$ by using Equation 2
$I$ = Armature current in amperes
$T$ = Total restoring torque in g. mm.
$\beta$ = Effective flux density in kilogausses = radial component of flux density averaged over armature width at both sides
$S$ = 1.9 = effective area of armature in sq. cm. + 0.98
$N$ = 1000 = number of turns on armature
$T_s$ = Torque of control springs in g. mm.
$T_p$ = Downscale parasitic torque on armature in g. mm.
$T_t$ = Downscale magnetic torque on temperature compensator in g. mm.

Equation 3 gives the desired current distribution. The current distribution of the instrument is changed to that desired by knocking down the magnet to change its strength and by varying the dimensions of the magnetic system by the flux diverter 58. Such changes mainly affect the flux density $\beta$ as a function of the pointer position. However, they also produce smaller changes in the restoring torques which must be taken into account.

Table

| Scale Point | Reflected Light, c./ft.$^2$ | | Incident Light, ft.-c. | |
|---|---|---|---|---|
| | Low Range | High Range | Low Range | High Range |
| . (Small dot) | .4 | 6.4 | 6 | 96 |
| 4X | .8 | 12.8 | 12 | 192 |
| 2X | 1.6 | 25.6 | 24 | 384 |
| 7 deg | 3.17 | 50 | 48 | 768 |
| 1 | 4 | 64 | 60 | 950 |
| 2 | 8 | 128 | 120 | 1,900 |
| 3 | 16 | 256 | 240 | 3,800 |
| 4 | 32 | 512 | 480 | 7,600 |
| 5 | 64 | 1,024 | 960 | 15,000 |
| 6 | 128 | 2,048 | 1,900 | 30,000 |
| 7 | 256 | 4,100 | 3,800 | 61,000 |

In accordance with the provisions of the patent statutes we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. In combination, an exposure meter comprising a casing having a transparent window therein, a light sensitive cell within the casing adapted to be exposed to light entering through said window, an apertured shutter between the window and cell movable between open and closed positions to vary the relation between the amount of light entering the window and that received by the cell, an electrical measuring instrument within said casing energized by current from said light cell when exposed to light, a pointer deflected by operation of said instrument in accordance with the measurement produced, an incident light attachment comprising a holder adapted to be attached to said casing over said transparent window and containing a window of light translucent material such as opal glass such that when in place light is received by said cell through both the transparent and translucent windows in series relation, said exposure meter, without the incident light attachment, being designed to provide reflected light measurements for photographic exposure purposes with the transparent window receiving light reflected from the subject to be photographed from picture taking position, and with the incident light attachment to provide comparable incident light measurements with the translucent window receiving diffused light with the meter at the subject position and with the window pointed towards the picture taking position, the window of said diffused light attachment being of such thickness and density that the meter will produce approximately the same measurement response when used in the two ways specified above, assuming no other changes in the lighting conditions.

2. An exposure meter comprising a casing, a transparent window in one end of the casing, a light sensitive cell within the casing positioned to receive light entering said window, an apertured shutter between the window and cell movable between open and closed positions to vary the relation between the amount of light entering the window and that received by the cell, an electrical measuring instrument in the casing energized by current from said cell in proportion to the cell illumination, a pointer deflected by the operation of said instrument, said combination being calibrated to produce correct light measurements with the shutter open and with it closed, a removable incident light attachment adapted to fit over said transparent window and containing a light diffusing window of substantially the same area and shape as said transparent window such that when the attachment is in place said two windows are in alignment and light received by the cell enters through both windows in series relation, the thickness and density of the light diffusing window being such in relation to the light distribution on the cell with the shutter open and closed that the combination gives the same light measurement results for both reflected and incident light measurements with the shutter open and gives the same light measurement results for both incident and reflected light measurements with the shutter closed.

References Cited in the file of this patent

UNITED STATES PATENTS

| 2,143,500 | Smethurst et al. | Jan. 10, 1939 |
| 2,175,027 | McCune | Oct. 3, 1939 |
| 2,214,283 | Norwood | Sept. 10, 1940 |
| 2,389,617 | Freund | Nov. 27, 1945 |
| 2,467,304 | Gannon | Apr. 12, 1949 |

FOREIGN PATENTS

| 475,590 | Great Britain | Nov. 23, 1937 |